United States Patent [19]
Miranti, Jr. et al.

[11] 3,981,206
[45] Sept. 21, 1976

[54] ENDLESS POWER TRANSMISSION BELT
[75] Inventors: Joseph P. Miranti, Jr., Nixa; Carl R. Woodland, Springfield, both of Mo.
[73] Assignee: Dayco Corporation, Dayton, Ohio
[22] Filed: Aug. 20, 1975
[21] Appl. No.: 606,153

[52] U.S. Cl. .................................. 74/233; 74/237
[51] Int. Cl.² ........................ F16G 5/16; F16G 1/22
[58] Field of Search ..................... 74/233, 234, 237

[56] References Cited
UNITED STATES PATENTS

| | | | |
|---|---|---|---|
| 2,728,239 | 12/1955 | Adams, Jr. | 74/233 X |
| 3,090,716 | 5/1963 | Stevens | 74/233 |
| 3,564,933 | 2/1971 | Clinkenbeard | 74/233 |
| 3,566,706 | 3/1971 | Fix | 74/233 |
| 3,800,610 | 4/1974 | Wach | 74/233 |

*Primary Examiner*—Leonard H. Gerin
*Attorney, Agent, or Firm*—Reuben Wolk

[57] ABSTRACT

An endless power transmission belt made primarily of an elastomeric material is provided and has a load-carrying section, a ribbed section adjacent the load-carrying section with the ribbed section having a plurality of ribs and the ribs being defined by a plurality of alternating projections and recesses, and a knit cover fabric bonded against the ribs and defining the inside surface of the belt with the knit fabric affording extensibility in a plurality of directions to assure the belt is particularly adapted to be operated in associated sheaves with minimum stresses being imposed thereon due to the cover fabric.

19 Claims, 7 Drawing Figures

U.S. Patent  Sept. 21, 1976  3,981,206
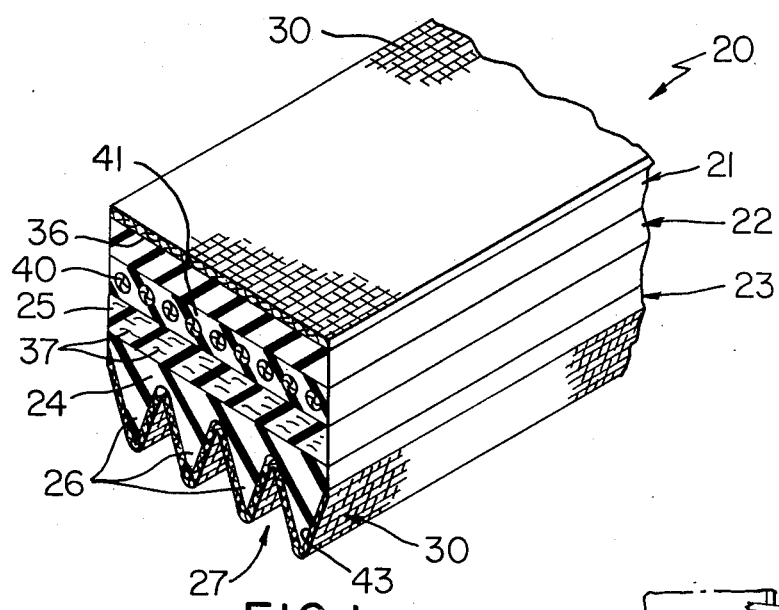
FIG. 1
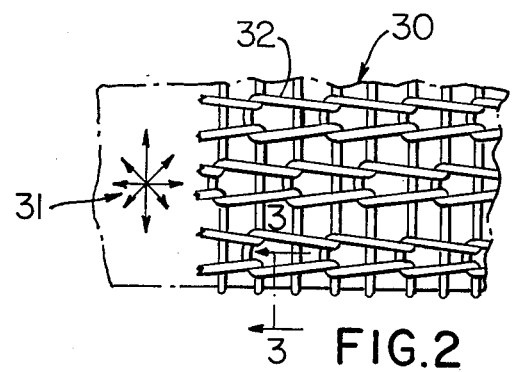
FIG. 2
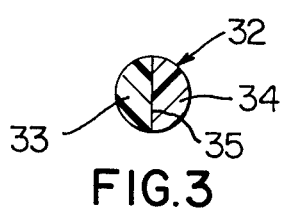
FIG. 3
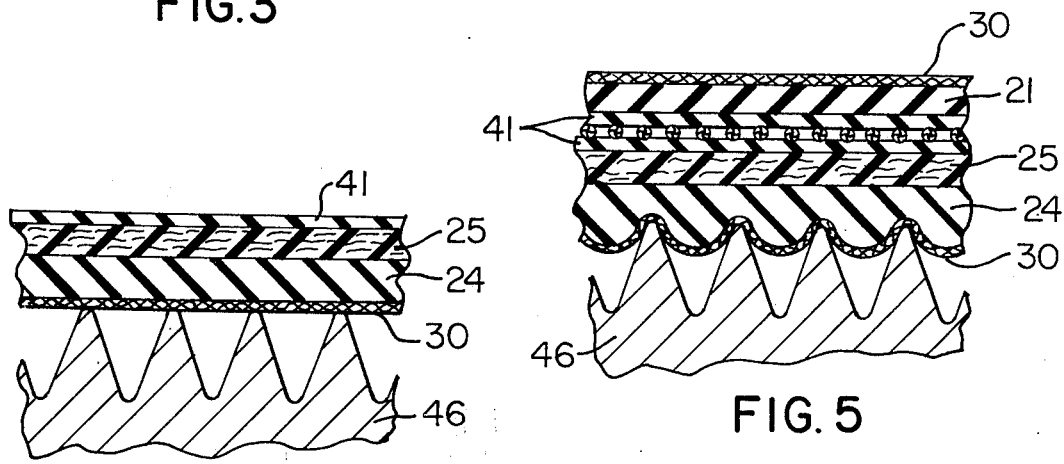
FIG. 4
FIG. 5
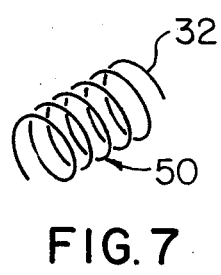
FIG. 7
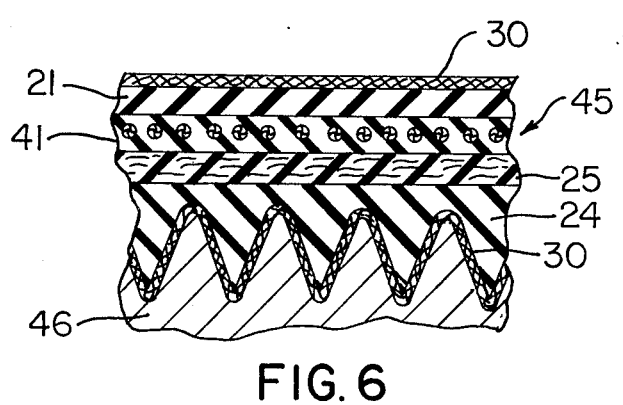
FIG. 6

ENDLESS POWER TRANSMISSION BELT

BACKGROUND OF THE INVENTION

Ribbed belts having a woven cover fabric defining the outside surface of the ribs have been proposed heretofore and examples of such belts are shown in U.S. Pat. Nos. 2,620,016; 2,728,239; 2,746,308; and 3,839,116. However, the belts of the type shown in these patents generally utilize so-called one-way stretch woven fabrics and when these belts are operated in associated sheaves considerable stresses are imposed on the fabric causing buckling of the fabric and premature wear and failure thereof and premature failure of their associated belts. Further, previous belts usually employ woven fabrics which generally must be positioned so that the warps of the fabric are at a particular angle relative to the belt axis resulting in added processing costs.

SUMMARY

It is a feature of this invention to provide an endless power transmission belt made primarily of an elastomeric material and having a ribbed section provided with a knit cover fabric which can easily extend and compress in a plurality of directions while maintaining the structural integrity of the fabric and its individual yarns.

Another feature of this invention is the provision of an endless power transmission belt having a ribbed section and having a knit cover fabric over the ribbed section which allows such cover fabric to be installed on the belt without regard to orientation of the yarn of the fabric relative to the belt axis.

Another feature of this invention is the provision of an endless power transmission belt made primarily of an elastomeric material and comprising a load-carrying section, a ribbed section adjacent the load-carrying section with the ribbed section having a plurality of ribs and the ribs being defined by a plurality of alternating projections and recesses, and a knit cover fabric bonded against the ribs and defining the inside surface of the belt with the knit fabric affording extensibility in a plurality of directions to assure the belt is particularly adapted to be operated in associated sheaves with minimum stresses being imposed thereon due to the cover fabric.

Accordingly, it is an object of this invention to provide an endless power transmission belt of the character mentioned having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a fragmentary perspective view with parts in cross-section and parts broken away illustrating one exemplary embodiment of the belt of this invention;

FIG. 2 is a fragmentary plan view of the knit fabric utilized on the belt of FIG. 1 and schematically illustrating that the fabric is extensible to an infinite number of directions;

FIG. 3 is a cross-sectional view taken essentially on the line 3—3 of FIG. 2;

FIG. 4 is an enlarged fragmentary cross-sectional view particularly illustrating a plurality of method steps which may be employed in making a belt sleeve from which the belt of FIG. 1 is cut by showing in cross-section various layers in the form of knit fabric, rib stock material, platform stock material, and a bottom cushion material for the load-carrying cord of the belt with these layers being shown wrapped around an associated matrix sleeve and concentrically against each other in the order stated;

FIG. 5 is an enlarged fragmentary cross-sectional view similar to FIG. 4 and particularly illustrating additional method steps used in making the belt sleeve by further showing a load-carrying cord wrapped against the bottom cushion material of FIG. 4; a top cushion material, a layer of elastomeric material defining the tension section of the belt, and a knit cover material outwardly of the tension layer;

FIG. 6 is an enlarged fragmentary cross-sectional view of the belt sleeve after curing and cooling of such sleeve and prior to removal of the belt sleeve from the matrix sleeve in preparation for cutting thereof to define a plurality of belts as shown in FIG. 1; and FIG. 7 is a fragmentary perspective view of an individual yarn of the knit fabric after curing of the belt sleeve with such yarn being drawn with an exaggerated helical configuration.

DESCRIPTION OF ILLUSTRATED EMBODIMENT

Reference is now made to FIG. 1 of the drawing which illustrates one exemplary embodiment of an endless power transmission belt structure or belt of this invention which is designated generally by the reference numeral 20. The belt 20 comprises a tension section 21, a load-carrying section 22 adjoining the tension section, and a compression section 23 adjoining the load-carrying section. The compression section 23 of this example comprises a ribbed section 24 adjacent the load-carrying section and in this example the ribbed section is arranged against and outwardly of a platform layer 25 which adjoins the load-carrying section 22 and the platform layer 25 will be described in more detail subsequently.

The ribbed section 24 is defined by a plurality of ribs each designated by the same reference numeral 26 and the ribs 26 are defined by a plurality of alternating projections and recesses as shown at 27 for example. The belt 20 has a knit cover fabric bonded against the ribs 26 and defining the inside surface of the belt and the knit fabric is designated generally by the reference numeral 30 and illustrated in detail in FIG. 2.

The knit fabric 30 affords extensibility in a plurality of directions and actually affords extensibility in an infinite number of directions in a plurality of planes and as designated schematically by the cluster of double arrows 31 in FIG. 2 for the plane of the drawing. The extensibility of the knit fabric in a plurality of directions assures that the belt 20 is particularly adapted to be operated in associated sheaves (not shown) with minimum stresses being imposed upon the fabric 30 and indeed on the belt 20. Further, the belt 20 may be operated on small diameter sheaves with minimum or substantially no likelihood that the knit cover 30 will become delaminated from such belt.

The knit fabric 30 is made of a yarn which is comprised of a plurality of synthetic plastic materials and in this example such yarn is designated generally by the reference numeral 32. The yarn 32 is made of a nylon-spandex biconstituent monofil with the nylon being designated by the reference numeral 33 and the spandex by the reference numeral 34 in FIG. 3. The nylon and spandex component portions of the yarn 32 of this example each has a substantially semicircular cross-sectional configuration and portions 33 and 34 are bonded together as a unitary structure on adjoining diameters as illustrated at 35.

Any suitable technique may be employed to define the nylon-spandex biconstituent monofil yarn 32; however, in this example of the invention the yarn is made by extrusion process by extruding the component materials through the same extrusion orifice and in accordance with techniques which are well known in the art.

The belt 20 may also be provided with a knit cover fabric bonded against the outside surface of the tension section as shown at 36 in FIG. 1 to define the outside surface of the belt 20. The knit fabric used to define the outside surface of the belt may be made of the same material as the knit fabric 30 bonded against the ribs 26 and in this example similar fabric 30 is employed to define such outside surface of belt 20.

As previously mentioned belt 20 has a platform layer 25 bonded against the load-carrying section 22 and such platform layer is preferably made of an elastomeric material which is shown in this example as rubber and has a plurality of discrete fibers, a few of which have been designated by the reference numeral 37, randomly dispersed therethrough and embedded therein whereby the elastomeric material of the platform layer serves as a matrix for the fibers 37.

The fibers 37 may be of any suitable size and material and may be arranged at any desired angle with respect to the longitudinal axis of the belt; however, the fibers 37 of this example are preferably arranged substantially perpendicular to the endless path of the belt or stated otherwise the fibers 37 are arranged perpendicular to the longitudinal axis of the belt when the belt is viewed in cross-section. The perpendicularly arranged fibers 37 provide optimum transverse rigidity for the belt 20.

The load-carrying section 22 of the belt 20 may also be made of any suitable load-carrying means, however, in this example of the invention the load-carrying section is comprised of a helically wound load-carrying cord 40 which is suitably surrounded by a cushion material 41 which in the cured belt is shown as a single unitary mass having the helically wound load-carrying cord suitably embedded in the center thereof when viewing the cushion material 41 and belt 20 in cross-section.

The belt 20 also has adhesive means 43, see FIG. 1, bonding the knit fabric 30 against the ribs 26 and has suitable adhesive means 43 bonding the knit fabric 30 to the outside surface of the tension section 21 as shown at 36. Any suitable adhesive means may be utilized and in accordance with any technique which is known in the art.

The belt 20 may be made utilizing any technique known in the art and a method which has been successfully used is disclosed in the above mentioned United States Pat. No. 3,839,116. As disclosed in detail in this patent and as basically shown in FIGS. 4, 5, and 6 of the drawing of this disclosure a belt sleeve shown at 45 in FIG. 6 and from which belt 20 of this invention are suitably cut is made utilizing a suitable matrix sleeve 46.

As shown in FIG. 4, the matrix sleeve 46 is suitably supported on a cylindrical drum, or the like, and has various layers of materials wrapped therearound which for simplicity of presentation are designated by the same reference numerals as in the completed belt 20. In particular, the knit fabric 30 is wrapped in position on matrix sleeve 46 followed in the order now to be stated hereinafter by rib stock material designated 24, platform stock material 25, bottom cushion material 41, helically wound load-carrying cord 40, top cushion material 41, tension layer material 21, and finally outside fabric layer 30 all as shown in FIG. 5.

The assembly as illustrated in FIG. 5 is suitably cured and cooled as is well known in the art whereupon the processing of the belt sleeve is essentially similar to the process disclosed in U.S. Pat. No. 3,839,116 whereby the cured belt sleeve 45 is removed from its matrix and cut to define a plurality of belts 20.

However, it will be appreciated that method steps disclosed in U.S. Pat. No. 3,839,116 need not necessarily be followed but other suitable techniques known in the art may be followed to define the belt 20, provided that the completed belt 20 has knit fabric 30 covering ribs 26 and defining the inside surface of the belt. In applications where it is also desired to provide a knit cover on the outside surface of the belt a knit fabric is also preferably utilized to define the outside cover.

It will also be appreciated that with the utilization of a biconstituent monofil during the process of curing the belt sleeve the nylon and spandex components of each yarn 32 shrink different amounts or degrees. This results in the yarn 32 assuming a helical configuration as illustrated in an exaggerated manner at 50 in FIG. 7. Such helical configuration may be considered a power-packed torque-free helical crimp which provides a stretchability for the yarn 30 of the completed belt 20 which heretofore was unknown in elastomeric belts.

Although any suitable biconstituent monofil yarn may be used, exceptionally good results may also be obtained utilizing nylon-spandex biconstituent monofil, manufactured by Monsanto Textiles Company, Decatur, Alabama 35601 and sold under the registered trademark of Monvelle.

In this disclosure of the invention, elastomeric material in the form of rubber has been illustrated as defining the various component sections of the belt 20; however, it will be appreciated that the belt 20 may be made of one or more suitable elastomeric materials.

In this disclosure of the invention the belt 20 has a platform layer 25 which utilizes discrete fibers 37. However, it will be appreciated that any suitable platform layer 25 may be provided in the belt and utilizing any suitable material known in the art.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt made primarily of an elastomeric material and comprising, a load-carrying section, a ribbed section adjacent said load-carrying section defined by a plurality of ribs, said ribs being defined by a plurality of alternating projections and recesses, and a knit cover fabric bonded against said ribs and defining the inside surface of said belt, said knit fabric being made of a yarn comprised of at least a pair of synthetic plastic materials which are bonded together on an interface having exposed edges, said knit fabric affording extensibility in a plurality of directions to assure said belt is particularly adapted to be operated in associated sheaves with minimum stresses being imposed thereon due to said cover fabric.

2. A belt as set forth in claim 1 in which said section adjacent said load-carrying section comprises a part of a compression section.

3. A belt as set forth in claim 2 in which said pair of synthetic plastic materials of said yarn is defined by a nylon-spandex biconstituent monofil.

4. A belt as set forth in claim 3 in which the nylon and spandex defining said monofil have substantially semicircular cross-sectional configurations and are bonded together on adjoining diameters to define said interface.

5. A belt as set forth in claim 4 in which said platform layer is in the form of a layer of elastomeric material having a plurality of discrete randomly dispersed fibers embedded therein.

6. A belt as set forth in claim 5 in which said fibers are arranged substantially perpendicular to the endless path of said belt.

7. A belt as set forth in claim 4 in which said load-carrying section comprises a helically wound load-carrying cord.

8. A belt as set forth in claim 1 and further comprising a tension section adjoining said load-carrying section and a compression section adjoining the opposite side of said load-carrying section, said compression section comprising a platform layer adjoining said load-carrying section and said ribbed section comprising said compression section and being disposed against said platform layer and defining the inside layer of said belt.

9. A belt as set forth in claim 8 and further comprising a knit cover fabric bonded against the outside surface of said tension section and defining the outside surface of said belt.

10. A belt as set forth in claim 8 in which said knit fabric bonded against the outside surface of said tension section is made of substantially the same material as the knit fabric bonded against said ribs.

11. A belt as set forth in claim 1 and further comprising adhesive means bonding said knit fabric against said ribs.

12. A belt as set forth in claim 1 in which said knit fabric is bonded against said ribs independently of any particular angle of the individual yarns comprising said fabric.

13. An endless power transmission belt comprising, a tension section, a load-carrying section adjoining said tension section, and a compression section adjoining said load-carrying section, said compression section comprising a ribbed section adjacent said load-carrying section with said ribbed section having a plurality of ribs, said ribs being defined by a plurality of alternating projections and recesses, and a knit cover fabric bonded against said ribs and defining the inside surface of said belt, said knit fabric being made of a yarn comprised of at least a pair of synthetic plastic materials which are bonded together on an interface having exposed edges, said knit fabric affording extensibility in a plurality of directions to assure said belt is particularly adapted to be operated in associated sheaves with minimum stresses being imposed thereon.

14. A belt as set forth in claim 13 in which said compression section further comprises a platform layer adjoining said load-carrying section and being comprised of an elastomeric matrix having a plurality of discrete fibers dispersed therethrough in a random manner, said fibers serving to increase the transverse rigidity of said belt.

15. A belt as set forth in claim 14 in which said pair of synthetic plastic materials of said yarn is defined by a nylon-spandex biconstituent monofil.

16. A belt as set forth in claim 15 in which the nylon and spandex defining said monofil have substantially semicircular cross-sectional configurations and are bonded together on adjoined diameters to define said interface.

17. A belt as set forth in claim 16 and further comprising a knit cover fabric bonded against the outside surface of said tension section and defining the outside surface of said belt.

18. A belt as set forth in claim 15 in which the nylon-spandex biconstituent monofil defining said yarn are preshrunk different degrees resulting in a helical configuration therefor providing improved stretchability for each biconstituent monofil and thus optimum stretchability for the entire yarn and said knit fabrid defined therewith.

19. A belt as set forth in claim 18 in which said platform layer is comprised of elastomeric material having a plurality of discrete randomly dispersed fibers embedded therein with the fibers being arranged substantially perpendicular to the endless path of the belt to afford optimum transverse rigidity therefor.

* * * * *